United States Patent [19]

Williams

[11] Patent Number: 5,568,447
[45] Date of Patent: Oct. 22, 1996

[54] INTERFACE MODULE FOR A TOWED ARRAY

[75] Inventor: Michael R. Williams, Ledyard, Conn.

[73] Assignee: The United States of America as represented by the Secretary of the Navy, Washington, D.C.

[21] Appl. No.: 530,463

[22] Filed: Dec. 8, 1995

[51] Int. Cl.⁶ .................................................. G01V 1/38
[52] U.S. Cl. ......................... 367/20; 114/247; 114/253; 367/15
[58] Field of Search ............................. 367/15, 20, 153, 367/154, 106, 130; 114/242, 249, 247, 253; 174/101.5

[56] References Cited

U.S. PATENT DOCUMENTS

| | | | |
|---|---|---|---|
| 4,090,168 | 5/1978 | Miller et al. | 367/131 |
| 4,317,185 | 2/1982 | Thigpen et al. | 367/15 |
| 4,660,183 | 4/1987 | McGowan et al. | 367/15 |

*Primary Examiner*—Ian J. Lobo
*Attorney, Agent, or Firm*—Michael J. McGowan; William F. Eipert; Prithvi C. Lall

[57] ABSTRACT

An interface module assembly for disposition between a marine tow cable and an array of acoustic receivers includes a plurality of bodies interconnected in series by flexible tethers. A proximal one of the bodies is adapted for connection to the tow cable and a distal one of the bodies is adapted for connection to the array. An external coaxial cable extends between each two of the bodies and is in communication with other external coaxial cables by way of internal coaxial cables within the bodies.

7 Claims, 2 Drawing Sheets

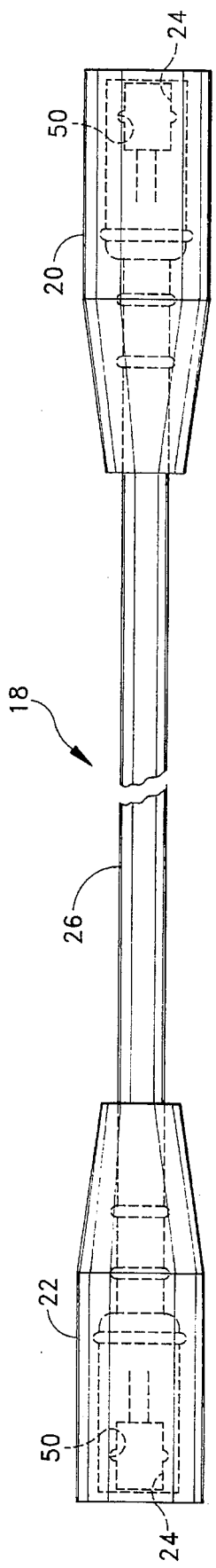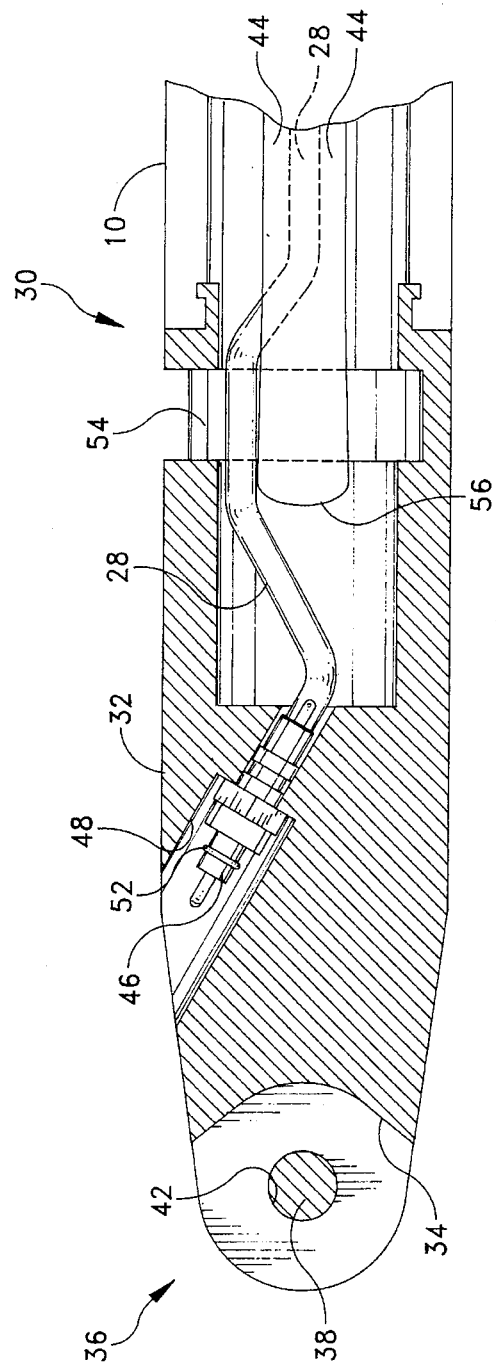

INTERFACE MODULE FOR A TOWED ARRAY

STATEMENT OF GOVERNMENT INTEREST

The invention described herein may be manufactured and used by or for the Government of the United States of America for governmental purposes without the payment of royalties thereon or therefor.

BACKGROUND OF THE INVENTION

1. Field of the Invention

The invention relates to interface modules for interconnecting mechanical and electrical components, and is directed more particularly to an interface module assembly for disposition between a marine tow cable and an array of acoustic receivers.

2. Description of the Prior Art

It is known to provide interface modules which have utility as connections between towed arrays of acoustic receivers and the electromechanical tow cable by which the array is towed behind a vessel, such as a submarine. The interface module provides the mechanical and electrical interface between the array and the tow cable.

In retrieving a tow cable and array, it often is necessary to bring the cable and array near the surface, and by grappling hook, or the like, fish out a section of the cable, the array, or the interface module, for manual handling. Upon application of a grappling hook to a part of the towed assembly, the assembly often bends around the hook and trails the hook while bent into roughly a 180° bend. Quite often, after undergoing such a bend, the electrical components of the array are found to be inoperative, having been incapacitated by the extreme bend in the cable and/or array.

Accordingly, there is a need to introduce into the assembly of components a section by which the assembly may be grappled and permitted to turn back on itself without crimping or breaking electrical components and without weakening structural integrity.

SUMMARY OF THE INVENTION

It is, therefore, an object of the invention to provide an interface module for disposition between an electromechanical marine tow cable and an array of acoustic receivers, which module provides facility for grappling of the module and provides facility for the module bending back upon itself without damage to the electrical components of the module and without weakening the structural integrity of the module.

With the above and other objects in view, as will hereinafter appear, a feature of the present invention is the provision of an interface module assembly for disposition between a marine tow cable and an array of acoustic receivers. The module assembly includes a plurality of bodies interconnected in series by flexible tethers. A proximal one of the bodies is adapted for connection to the tow cable and a distal one of the bodies is adapted for connection to the array. An external coaxial cable extends between each two of the bodies and is in communication with other external coaxial cables by way of internal coaxial cables within the bodies.

The above and other features of the invention, including various novel details of construction and combinations of parts, will now be more particularly described with reference to the accompanying drawings and pointed out in the claims.

It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 3 is an elevational view of an external coaxial cable assembly of an interface module; and FIG. 4 is a partial sectional view of a body portion of an interface module.

DESCRIPTION OF THE PREFERRED EMBODIMENT

Figure 1:
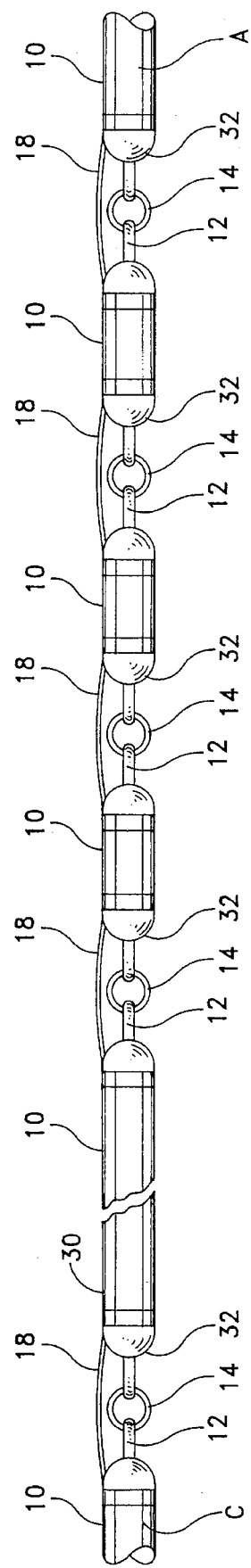
FIG. 1 is an elevational view of one form of interface module illustrative of an embodiment of the invention.

Referring to FIG. 1, it will be seen that the illustrative interface module (IM) is adapted for disposition between an electromechanical marine tow cable C and an acoustic receiver array A, and includes a plurality of bodies 10 interconnected in series by flexible tethers, preferably chains 12.

Figure 2:
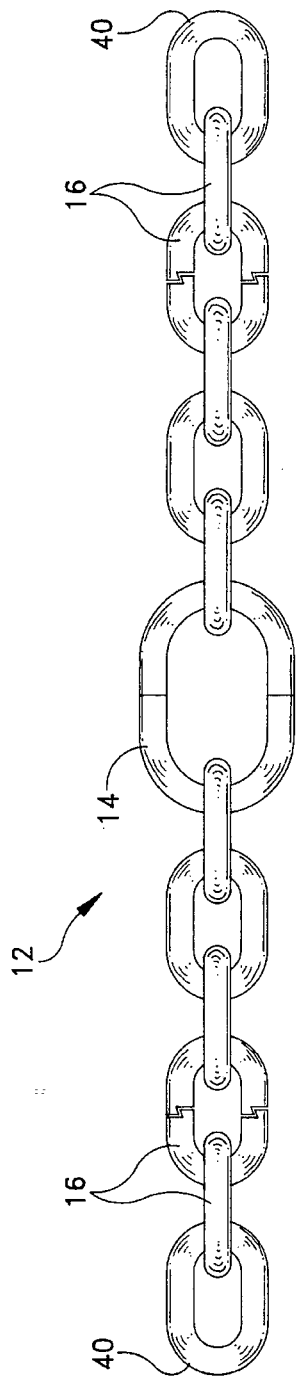
FIG. 2 is an elevational view of a chain portion of an interface module.

The chains 12 preferably are of a high strength metal alloy, coated with a protective plastics material. A center link (FIG. 2) in each chain 12 serves as an attachment ring 14, adapted to be engaged by a grappling hook, or the like, and is larger than the remaining links 16 of the chain. In practice, it has been found that sixteen links 16 on either side of attachment ring 14, the entire 33 link chain being of a length of over 50 inches, provide the requisite flexibility while retaining the required strength, and desired light weight of the IM. It will be apparent that the length of chain 12 for a particular application will depend upon the length of an associated coaxial cable assembly, to be described herein below.

Referring again to FIG. 1, it will be seen that interconnecting each two end-to-end bodies 10 is a coaxial cable assembly 18. In FIG. 3, coaxial cable assembly 18 will be seen to include first and second locking sleeves 20, 22 having therein recesses 24, the locking sleeves being interconnected by a coaxial cable member 26. The assembly 18 may, in practice, be about 60 inches in length. Obviously, the length of assembly 18 for a particular application must be coordinated with the length of the associated chain 12. The locking sleeves preferably are principally of a high strength plastic, such as acetal resin, available under the tradename "Delrin", or the like.

Referring to FIG. 4, it will be seen that at a chain connection end 30 of each of the bodies 10 there is provided a bulkhead 32 sealing the chain connection end 30. Each of the bulkheads 32 is provided with a slot 34 at the outer end 36 thereof with a removable chain pin 38 extending across the slot 34. In assembly, an end link 40 (FIG. 2) of a chain 12 is placed in slot 34 and the chain pin 38 inserted in holes 42 (one shown in FIG. 4) to lock the chain 12 and body 10 together.

Extending through the body 10 is internal coaxial cable 28 and a strength member 44. The coaxial cable 28 extends to a connector 46 disposed in a socket 48 sized and configured to receive one of the locking sleeves (20, 22; FIG. 3). The recess 24 in each locking sleeve (20, 22) is adapted to fit upon connector 46 to place the external coaxial cable members 26 in communication with the internal coaxial cables 28. The locking sleeve recesses 24 are each provided with an annular groove 50, shown in FIG. 3, into which snaps an annular ring 52, shown in FIG. 4, to lock the sleeve 20, 22 and connector 46 together.

Each bulkhead 32 is provided with a locking pin 54 for receiving an end 56 of the strength member 44 in the bulkhead, as is known in the art.

In operation, in the course of retrieving the tow cable and array, or transferring the cable and array between vessels, it is necessary to bring the assembly near the surface, and to grasp the assembly along its extended length and pull the assembly forwardly. In use of the present invention, in such circumstances, a grappling hook is used to snare the attachment ring 14 of one of the chains 12. The chain links 16, 40 on either side of the attachment ring 14 double back from the attachment ring to form a substantially or generally 180° bend. However, the external coaxial cable members 26 are quite flexible and experience the bend without damage and/or loss of power to the array. Inasmuch as the chain 12 experiences the bend, no structural components of the cable/array assembly are crimped, avoiding any mechanical failure. Upon release of the IM by the grappling hook, the entire cable/array assembly resumes its generally linear configuration without having suffered loss of electrical continuity, or power altogether, or loss of mechanical integrity.

It is to be understood that the present invention is by no means limited to the particular construction herein disclosed and/or shown in the drawings, but also comprises any modifications or equivalents within the scope of the claims.

What is claimed is:

1. An interface module assembly for disposition between a marine tow cable and an array of acoustic receivers, said module assembly comprising:

a plurality of bodies interconnected in series by flexible tethers, a proximal one of said bodies being adapted for connection to the tow cable, and a distal one of said bodies being adapted for connection to the array;

an external coaxial cable assembly extending between each two of said bodies and in communication with each other by way of internal coaxial cables within said bodies.

2. The assembly in accordance with claim 1 wherein said tethers each comprise a chain.

3. The assembly in accordance with claim 2 wherein each of said chains includes an attachment ring adapted for engagement by a grappling hook.

4. The assembly in accordance with claim 1 wherein said external coaxial cable assembly comprises first and second locking sleeves interconnected by a coaxial cable member, each of said locking sleeves having an axial recess therein.

5. The assembly in accordance with claim 4 wherein the length of each of said coaxial cable assemblies exceeds the length of one of said tethers alongside said cable assembly.

6. The assembly in accordance with claim 1 wherein each of said bodies includes a bulkhead at each chain connection end thereof, said bulkhead having locking means for receiving and retaining an end of one of said tethers, and connector means for receiving and retaining an end of one of said external coaxial cable assemblies.

7. The assembly in accordance with claim 6 wherein said connector means is in communication with one of said internal coaxial cables.

\* \* \* \* \*